United States Patent
Suei et al.

(10) Patent No.: US 12,139,597 B2
(45) Date of Patent: Nov. 12, 2024

(54) RESIN COMPOSITION SUITABLE FOR USE AS FILM FOR FILM CAPACITOR

(71) Applicant: Oji Holdings Corporation, Tokyo (JP)

(72) Inventors: Takumi Suei, Tokyo (JP); Kazuo Ikeda, Tokyo (JP); Akihiro Kakehi, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 0 days.

(21) Appl. No.: 17/767,505

(22) PCT Filed: Oct. 7, 2020

(86) PCT No.: PCT/JP2020/037998
§ 371 (c)(1),
(2) Date: Apr. 8, 2022

(87) PCT Pub. No.: WO2021/070863
PCT Pub. Date: Apr. 15, 2021

(65) Prior Publication Data
US 2024/0093016 A1    Mar. 21, 2024

(30) Foreign Application Priority Data

Oct. 11, 2019  (JP) ................ 2019-187689
Oct. 11, 2019  (JP) ................ 2019-187691
Oct. 7, 2020   (JP) ................ 2020-169612
Oct. 7, 2020   (JP) ................ 2020-169613

(51) Int. Cl.
*C08L 25/06* (2006.01)
*C08J 5/18* (2006.01)
*H01G 4/06* (2006.01)
*H01G 4/32* (2006.01)

(52) U.S. Cl.
CPC ............ *C08L 25/06* (2013.01); *C08J 5/18* (2013.01); *H01G 4/06* (2013.01); *C08J 2325/06* (2013.01); *C08J 2453/02* (2013.01); *C08J 2471/12* (2013.01); *C08L 2205/03* (2013.01); *H01G 4/32* (2013.01)

(58) Field of Classification Search
CPC .......... A01N 63/50; C05B 15/00; C05C 9/00; C05D 9/02; C05F 11/08; C05F 17/20; C05G 3/60; C07K 14/415; C12N 1/20; C12N 15/8237; C12N 15/8249; C12N 15/8279; C12N 9/2494; C12N 9/78; C12Y 302/01; C12Y 302/01078; C12Y 305/99007; C12Y 402/0202; Y02A 40/22; Y02E 50/30; Y02P 60/21; Y02W 30/40
See application file for complete search history.

(56) References Cited

U.S. PATENT DOCUMENTS

| | | |
|---|---|---|
| 6,849,695 B2 | 2/2005 | Sato |
| 2003/0130421 A1 | 7/2003 | Sato |
| 2004/0152838 A1 | 8/2004 | Okada et al. |
| 2014/0005091 A1 | 1/2014 | Reinhardt et al. |
| 2014/0050913 A1 | 2/2014 | Nakahiro et al. |

FOREIGN PATENT DOCUMENTS

| | | |
|---|---|---|
| JP | H08-323878 A | 12/1996 |
| JP | H09-052959 A | 2/1997 |
| JP | 9-77935 A | 3/1997 |
| JP | 11-268117 A | 10/1999 |
| JP | 2000-080228 A | 3/2000 |
| JP | 2002-356593 A | 12/2002 |
| JP | 2003-185064 A | 7/2003 |
| JP | 2004-217771 A | 8/2004 |
| JP | 2012-246372 A | 12/2012 |
| JP | 2016-30419 A | 3/2016 |
| JP | 2017-036373 A | 2/2017 |
| WO | 2016/080356 A1 | 5/2016 |

OTHER PUBLICATIONS

International Search Report of PCT/JP2020/037998 dated Dec. 22, 2020 [PCT/ISA/210].
Office Action issued Mar. 8, 2024 in Chinese Application No. 202080070903.0.
Office Action dated Sep. 3, 2024 in Japanese Application No. 2023-205942.
Office Action dated Sep. 3, 2024 in Japanese Application No. 2023-205948.

*Primary Examiner* — Lawrence D Ferguson
(74) *Attorney, Agent, or Firm* — Sughrue Mion, PLLC

(57) ABSTRACT

Provided is a technique of obtaining films with higher dielectric breakdown strength at high temperatures and folding resistance. A resin composition comprises (1) a syndiotactic polystyrene resin, (2) a polyphenylene ether resin, and (3) at least one member selected from the group consisting of styrene-based thermoplastic elastomers and atactic polystyrene resins, wherein the content of the polyphenylene ether resin in the resin composition is 6 mass % or more.

18 Claims, No Drawings

RESIN COMPOSITION SUITABLE FOR USE AS FILM FOR FILM CAPACITOR

TECHNICAL FIELD

The present invention relates to a resin composition and the like. In particular, the present invention relates to a resin composition suitable for use in films for film capacitors.

BACKGROUND ART

Conventionally, in electronic devices, electrical devices, etc., capacitors using resin films are used as, for examples, high-voltage capacitors, filter capacitors for various switching power supplies, converters, and inverters, and smoothing capacitors. Resin film capacitors are also used in inverters and converters that control the drive motors of electric vehicles and hybrid vehicles, for which demand is increasing in recent years.

Capacitors, particularly capacitors for vehicles, are increasingly used in high-temperature environments. For example, the use of semiconductors with high heat resistance (silicon carbide semiconductors etc.) is recently increasing in devices that control the drive motors of vehicles (inverters, converters, etc.). Along with this, higher heat resistance is also required for the capacitors used in these devices.

In addition, since resin films for capacitors are generally continuously produced as wound products of long films, stable film formation is required without breakage during formation.

CITATION LIST

Patent Literature

PTL 1: WO2016/080356

SUMMARY OF INVENTION

Technical Problem

In the course of research, the present inventors particularly focused on, among heat resistance, dielectric breakdown strength at high temperatures, and further focused on folding resistance to obtain excellent film-forming properties.

PTL 1 discloses a film with excellent heat resistance containing a syndiotactic polystyrene resin and a polyphenylene ether resin. The film is described as having excellent dielectric breakdown strength; however, dielectric breakdown strength at high temperatures and folding resistance are nowhere mentioned. When the present inventors evaluated the dielectric breakdown strength at high temperatures and folding resistance of the film containing a syndiotactic polystyrene resin and a polyphenylene ether resin, both evaluations were low.

Accordingly, a primary object of the present invention is to provide a technique of obtaining films with higher electric breakdown strength at high temperatures and folding resistance.

Solution to Problem

As a result of extensive studies, the present inventors found that the above object can be achieved by obtaining a film using a resin composition comprising (1) a syndiotactic polystyrene resin, (2) a polyphenylene ether resin, and (3) at least one member selected from the group consisting of styrene-based thermoplastic elastomers and atactic polystyrene resins, wherein the content of the polyphenylene ether resin in the resin composition is 6 mass % or more. As a result of further studies based on this finding, the present inventors have completed the present invention. Specifically, the present invention includes the following aspects.

Item 1. A resin composition comprising:
(1) a syndiotactic polystyrene resin,
(2) a polyphenylene ether resin, and
(3) at least one member selected from the group consisting of styrene-based thermoplastic elastomers and atactic polystyrene resins;
wherein the content of the polyphenylene ether resin in the resin composition is 6 mass % or more.

Item 2. The resin composition according to Item 1, wherein the content of the syndiotactic polystyrene resin in the resin composition is 40 mass % or more and less than 94 mass %.

Item 3. The resin composition according to Item 1 or 2, wherein the content of the polyphenylene ether resin in the resin composition is 6 mass % or more and 40 mass % or less.

Item 4. The resin composition according to any one of Items 1 to 3, comprising a styrene-based thermoplastic elastomer.

Item 5. The resin composition according to any one of Items 1 to 4, wherein the content of the styrene-based thermoplastic elastomer in the resin composition is 1 mass % or more and 20 mass % or less.

Item 6. The resin composition according to any one of Items 1 to 5, wherein the content of a conjugated diene compound polymer block and/or a hydrogenated block thereof (Sb) in the styrene-based thermoplastic elastomer is 20 to 75 mass %.

Item 7. The resin composition according to any one of Items 1 to 6, wherein the content of the conjugated diene compound polymer block and/or the hydrogenated block thereof (Sb) in the resin composition is 1 to 10 mass %.

Item 8. The resin composition according to any one of Items 1 to 7, wherein the styrene-based thermoplastic elastomer is a styrene-ethylene-butylene-styrene block copolymer (SEBS).

Item 9. The resin composition according to any one of Items 1 to 8, comprising an atactic polystyrene resin.

Item 10. The resin composition according to any one of Items 1 to 9, wherein the content of the atactic polystyrene resin in the resin composition is 2 mass % or more and 20 mass % or less.

Item 11. A film comprising a film-like layer of the resin composition according to any one of Items 1 to 10.

Item 12. The film according to Item 11, which is a biaxially stretched film.

Item 13. The film according to Item 11 or 12, which is a single-layer film.

Item 14. The film according to any one of Items 11 to 13, which has a thickness of 1 µm or more and 10 µm or less.

Item 15. The film according to any one of Items 11 to 14, for use in a capacitor.

Item 15A. Use of the film according to any one of Items 11 to 14 as a capacitor, or for producing a capacitor.

Item 16. A capacitor metallized film having a metal film on one side or both sides of the film according to any one of Items 11 to 15.

Item 16A. Use of a metallized film having a metal film on one side or both sides of the film according to any one of Items 11 to 15 as a capacitor, or for producing a capacitor.

Item 17. A capacitor comprising the film according to any one of Items 11 to 16.

Advantageous Effects of Invention

The present invention can provide a resin composition that can give films with higher dielectric breakdown strength at high temperatures and folding resistance. Further, the present invention can provide a film with higher dielectric breakdown strength at high temperatures and folding resistance, a capacitor metallized film with higher dielectric breakdown strength at high temperatures, a capacitor, and the like.

DESCRIPTION OF EMBODIMENTS

In the present specification, the terms "comprise" and "contain" include the concepts of "comprise," "contain," "substantially consist of," and "consist of."

The content of each component in the resin composition of the present invention and in the film of the present invention is calculated from the component content of each raw material used, if known, and the mixing ratio of the raw materials. When raw materials with an unknown component content are used, the content of each component in the raw materials is measured by the method described in the "(1-5) Measurement and Calculation of Content of Each Component in Biaxially Stretched Film" section of the Examples, and the content of each component in the resin composition of the present invention and in the film of the present invention is calculated from the contents measured above and the mixing ratio of the raw materials. If the content ratio of raw materials is unknown, the content of each component in the resin composition of the present invention and in the film of the present invention is calculated by the method described in the "(1-5) Measurement and Calculation of Content of Each Component in Biaxially Stretched Film" section of the Examples.

1. Resin Composition

In one embodiment, the present invention relates to a resin composition comprising (1) a syndiotactic polystyrene resin, (2) a polyphenylene ether resin, and (3) at least one member selected from the group consisting of styrene-based thermoplastic elastomers and atactic polystyrene resins, wherein the content of the polyphenylene ether resin in the resin composition is 6 mass % or more (in the present specification, also referred to as "the resin composition of the present invention"). This is described below.

The syndiotactic polystyrene resin is not particularly limited as long as it is a polystyrene resin having a syndiotactic structure. The syndiotactic structure means that the stereochemical structure is a syndiotactic structure, i.e., a three-dimensional structure in which phenyl groups and substituted phenyl groups, which are side chains, are alternately located in opposite directions with respect to the main chain formed from carbon-carbon bonds. Tacticity is generally quantified by an isotopic carbon nuclear magnetic resonance method ($^{13}$C-NMR method), and can be indicated by the proportion of continuous structural units, for example, a diad for two units, a triad for three units, and a pentad for five units.

The syndiotactic polystyrene resin, for example, in terms of a racemic diad, has a syndiotacticity of, for example, 75% or more, and preferably 85% or more. Further, the syndiotactic polystyrene resin, for example, in terms of a racemic pentad, has a syndiotacticity of, for example, 30% or more, and preferably 50% or more.

Specific examples of the syndiotactic polystyrene resin include polystyrene, poly(alkylstyrene), poly(halogenated styrene), poly(halogenated alkylstyrene), poly(alkoxystyrene), poly(vinyl benzoate), hydrogenated polymers thereof and mixtures thereof, or copolymers containing these as main components, and the like.

Examples of the poly(alkylstyrene) include poly(methylstyrene), poly(ethylstyrene), poly(isopropylstyrene), poly(tertiary butylstyrene), poly(phenylstyrene), poly(vinyl styrene), poly(vinyl naphthalene), and the like. Examples of the poly(halogenated styrene) include poly(chlorostyrene), poly(bromostyrene), poly(fluorostyrene), and the like. Examples of the poly(halogenated alkylstyrene) include poly(chloromethylstyrene) and the like. Examples of the poly(alkoxystyrene) include poly(methoxystyrene), poly(ethoxystyrene), and the like.

Particularly preferred syndiotactic polystyrene resins among these are polystyrene, poly(p-methylstyrene), poly(m-methylstyrene), poly(p-tertiary butylstyrene), poly(p-chlorostyrene), poly(m-chlorostyrene), poly(p-fluorostyrene), hydrogenated polystyrene, styrene-alkylstyrene copolymers such as a copolymer of styrene and p-methylstyrene, and the like.

The molecular weight of the syndiotactic polystyrene resin is not particularly limited. For example, the mass average molecular weight (weight average molecular weight) is 10,000 or more and 3 million or less, preferably 50,000 or more and 1 million or less, and more preferably 100,000 or more and 500,000 or less. The mass average molecular weight is a value measured by gel permeation chromatography at 135° C. using 1,2,4-trichlorobenzene as a solvent.

The melting point of the syndiotactic polystyrene resin is not particularly limited. The melting point is, for example, 200° C. or higher and 320° C. or lower, and preferably 220° C. or higher and 280° C. or lower. The melting point is a melting peak temperature measured according to JIS K7121: 2012.

The syndiotactic polystyrene resin is available as a commercial product, or can be produced by a known method. The syndiotactic polystyrene resin is available as, for example, "XAREC(registered trademark)" (142ZE, 300ZC, 130ZC, or 90ZC) produced by Idemitsu Kosan Co., Ltd.

The syndiotactic polystyrene resins can be used singly or in combination of two or more.

The content of the syndiotactic polystyrene resin is not particularly limited; however, the resin is preferably a component with the highest content in the resin composition of the present invention.

From the viewpoint of dielectric breakdown strength at high temperatures, folding resistance, etc., the content of the syndiotactic polystyrene resin in the resin composition of the present invention is, for example, 40 mass % or more and less than 94 mass %, preferably 40 mass % or more and 93 mass % or less, more preferably 40 mass % or more and 91 mass % or less, even more preferably 40 mass % or more and 87 mass % or less, still even more preferably 45 mass % or more and 80 mass % or less, especially more preferably 50 mass % or more and 75 mass % or less, especially even more preferably 55 mass % or more and 70 mass % or less, and particularly preferably 60 mass % or more and 70 mass % or less.

The polyphenylene ether resin is not particularly limited, and is typically a polymer having a structural unit represented by the following formula (1). The polyphenylene ether resin may comprise a single repeating structural unit, or two or more repeating structural units.

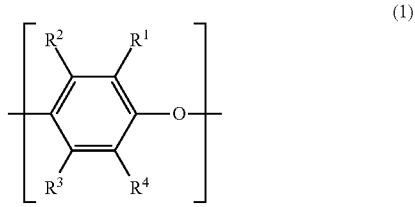

(1)

wherein $R^1$, $R^2$, $R^3$, and $R^4$ are the same or different, and each is a hydrogen atom, a halogen atom, an optionally substituted alkyl group, an optionally substituted alkenyl group, an optionally substituted alkynyl group, an optionally substituted aryl group, an optionally substituted aralkyl group, an optionally substituted alkylaralkyl group, or an optionally substituted alkoxy group.

The halogen atom is not particularly limited, and examples include fluorine, chlorine, bromine, and iodine atoms.

The alkyl group includes a linear, branched, or cyclic (preferably linear or branched, and more preferably linear) alkyl group. The number of carbon atoms in the alkyl group (in the case of a linear or branched alkyl group) is not particularly limited, and is, for example, 1 to 8. The number of carbon atoms is preferably 1 to 4, more preferably 1 to 3, even more preferably 1 or 2, and still even more preferably 1. The number of carbon atoms in the alkyl group (in the case of a cyclic alkyl group) is not particularly limited, and is, for example, 3 to 7, and preferably 4 to 6. Specific examples of the alkyl group include methyl, ethyl, n-propyl, isopropyl, n-butyl, isobutyl, tert-butyl, sec-butyl, n-pentyl, neopentyl, n-hexyl, 3-methylpentyl, n-heptyl, and n-octyl groups.

The alkenyl group includes a linear or branched (preferably linear) alkenyl group. The number of carbon atoms in the alkenyl group is not particularly limited, and is, for example, 2 to 8. The number of carbon atoms is preferably 2 to 4. Specific examples of the alkenyl group include vinyl, allyl, 1-propenyl, isopropenyl, butenyl, pentenyl, and hexenyl groups.

The alkynyl group includes a linear or branched (preferably linear) alkynyl group. The number of carbon atoms in the alkynyl group is not particularly limited, and is, for example, 2 to 8. The number of carbon atoms is preferably 2 to 4. Specific examples of the alkynyl group include ethynyl, propynyl (e.g. 1-propynyl and 2-propynyl (propargyl)), butynyl, pentynyl, and hexynyl groups.

The aryl group is not particularly limited, and is preferably one having 6 to 12 carbon atoms, preferably 6 to 12 carbon atoms, and even more preferably 6 to 8 carbon atoms. The aryl group may be monocyclic or polycyclic (e.g., bicyclic or tricyclic), but is preferably monocyclic. Specific examples of the aryl group include phenyl, naphthyl, biphenyl, pentalenyl, indenyl, anthranyl, tetracenyl, pentacenyl, pyrenyl, perylenyl, fluorenyl, and phenanthryl groups; and preferably a phenyl group.

The aralkyl group is not particularly limited, and examples include aralkyl groups formed by replacing at least one hydrogen atom (e.g., 1 to 3 hydrogen atoms, and preferably 1 hydrogen atom) of the above alkyl groups with the above aryl group. Specific examples of the aralkyl group include benzyl and phenethyl groups.

The alkylaryl group is not particularly limited, and examples include alkylaryl groups formed by replacing at least one hydrogen atom (e.g., 1 to 3 hydrogen atoms, and preferably 1 hydrogen atom) of the above aryl groups with the above alkyl group. Specific examples of the alkylaryl group include tolyl and xylyl groups.

The alkylaralkyl group is not particularly limited, and examples include alkylaralkyl groups formed by replacing at least one hydrogen atom (e.g., 1 to 3 hydrogen atoms, and preferably 1 hydrogen atom) on the aromatic ring of the above aralkyl groups with the above alkyl group.

The alkoxy group is not particularly limited, and examples include linear or branched (preferably linear) alkoxy groups having 1 to 8 carbon atoms, preferably 1 to 4 carbon atoms, more preferably 1 to 3 carbon atoms, even more preferably 1 or 2 carbon atoms, and still even more preferably 1 carbon atom. Examples of the alkoxy group include methoxy, ethoxy, n-propoxy, isopropoxy, n-butoxy, isobutoxy, sec-butoxy, and t-butoxy groups.

Examples of the substituents of the above alkyl, alkenyl, alkynyl, aryl, aralkyl, alkylaryl, alkylaralkyl, alkoxy, and like groups include a halogen atom, a hydroxyl group, and the like. The number of substituents is not particularly limited, and is, for example, 0 to 3, preferably 0 or 1, and more preferably 0.

In a preferred embodiment of the present invention, $R^1$, $R^2$, $R^3$, and $R^4$ are the same or different, and each is a hydrogen atom, a halogen atom, or an optionally substituted alkyl group (preferably an unsubstituted alkyl group). Further, $R^2$ and $R^3$ are preferably hydrogen atoms, and $R^1$ and $R^4$ are preferably groups other than hydrogen atoms.

Specific examples of the polyphenylene ether resin include poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly(2-(4'-methylphenyl)-1,4-phenylene ether), poly(2-bromo-6-phenyl-1,4-phenylene ether), poly(2-methyl-6-phenyl-1,4-phenylene ether), poly(2-phenyl-1,4-phenylene ether), poly(2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether), poly(2,6-dimethyl-1,4-phenylene ether), and like homopolymers, and copolymers thereof.

In addition, those modified with a modifying agent, such as maleic anhydride or fumaric acid, are also suitably used. Further, copolymers obtained by graft-copolymerizing or block-copolymerizing vinyl aromatic compounds such as styrene with the above polyphenylene ether are also used. Particularly preferred among these is poly(2,6-dimethyl-1,4-phenylene ether).

The number average molecular weight of the polyphenylene ether resin is not particularly limited, but is preferably 1 to 100,000, and more preferably 15,000 to 50,000, from the viewpoint of extrusion moldability and continuous stretchability. The number average molecular weight is determined by converting a value of molecular weight measured by the GPS method to a value of polystyrene.

The polyphenylene ether resin is available as a commercial product, or can be produced by a known method. As the polyphenylene ether resin, for example, Iupiace (registered trademark) series (e.g., Iupiace (registered trademark) PX100L) produced by Mitsubishi Engineering-Plastics Corporation, ZYRON (registered trademark) series (e.g., ZYRON (registered trademark) S201A) produced by Asahi Kasei Corporation, or the like can be suitably used.

The polyphenylene ether resins can be used singly or in combination of two or more.

The content of the polyphenylene ether resin in the resin composition of the present invention is 6 mass % or more. This can enhance dielectric breakdown strength at high temperatures and folding resistance. From the viewpoint of dielectric breakdown strength at high temperatures, folding resistance, etc., the content of the polyphenylene ether resin is preferably 6 mass % or more and 40 mass % or less, more preferably 8 mass % or more and 35 mass % or less, even more preferably 10 mass % or more and 32 mass % or less, still even more preferably 15 mass % or more and 30 mass % or less, and particularly preferably 20 mass % or more and 28 mass % or less.

The resin composition of the present invention comprises at least one member selected from the group consisting of styrene-based thermoplastic elastomers and atactic polystyrene resins.

In a preferred embodiment, the resin composition of the present invention comprises a styrene-based thermoplastic elastomer.

The styrene-based thermoplastic elastomer is not particularly limited, and known elastomers can be used. The addition of the styrene-based thermoplastic elastomer can enhance dielectric breakdown strength at high temperatures and folding resistance. The styrene-based thermoplastic elastomer generally has a styrene monomer polymer block (Hb), which serves as a hard segment, and a conjugated diene compound polymer block or a hydrogenated block thereof (Sb), which serves as a soft segment. The structure of the styrene-based thermoplastic elastomer may be a diblock structure represented by Hb-Sb, a triblock structure represented by Hb-Sb-Hb or Sb-Hb-Sb, a tetrablock structure represented by Hb-Sb-Hb-Sb, or a polyblock structure in which a total of 5 or more Hb and Sb are linearly linked.

The styrene-based monomer used in the styrene monomer polymer block (Hb) is not particularly limited, and examples include styrene and derivatives thereof. Specific examples include styrenes, such as styrene, α-methylstyrene, 2-methylstyrene, 4-methylstyrene, 4-propylstyrene, 4-t-butylstyrene, 4-cyclohexylstyrene, 4-dodecylstyrene, 2-ethyl-4-benzylstyrene, 4-(phenylbutyl)styrene, 2,4,6-trimethylstyrene, monofluorostyrene, difluorostyrene, monochlorostyrene, dichlorostyrene, methoxystyrene, and t-butoxystyrene; vinyl group-containing aromatic compounds, such as vinylnaphthalenes including 1-vinylnaphthalene and 2-vinylnaphthalene; vinylene group-containing aromatic compounds, such as indene and acenaphthylene; and the like. Preferred among these is styrene. The styrene-based monomers may be used singly or in combination of two or more.

Further, the conjugated diene compound used in the conjugated diene compound polymer block (Sb) is also not particularly limited. Examples of the conjugated diene compound include butadiene, isoprene, 2,3-dimethylbutadiene, pentadiene, hexadiene, and the like. Preferred among these is butadiene. The conjugated diene compounds may be used singly or in combination of two or more. Further, other comonomers, such as ethylene, propylene, butylene, and styrene, can also be copolymerized. The conjugated diene compound polymer block (Sb) may also be a hydrogenated product that is partially or fully hydrogenated.

Specific examples of the styrene-based thermoplastic elastomer include styrene-isoprene diblock copolymers (SI), styrene-butadiene diblock copolymers (SB), styrene-isoprene-styrene triblock copolymers (SIS), styrene-butadiene/isoprene-styrene triblock copolymers (SB/IS), and styrene-butadiene-styrene triblock copolymers (SBS), as well as hydrogenated products thereof. Examples of hydrogenated products include styrene-ethylene-butylene-styrene copolymers (SEBS), styrene-ethylene-propylene-styrene copolymers (SEPS), styrene-ethylene-ethylene-propylene-styrene copolymers (SEEPS), styrene-butylene-butadiene-styrene copolymers (SBBS), and the like. Preferred among these are hydrogenated products, and particularly preferred is SEBS.

The content of the styrene monomer polymer block unit (Hb) in the styrene-based thermoplastic elastomer is, for example, 5 mass % or more and 80 mass % or less. From the viewpoint of dielectric breakdown strength at high temperatures, folding resistance, etc., it is preferably 25 mass % or more and 80 mass % or less, more preferably 30 mass % or more and 70 mass % or less, and even more preferably 35 mass % or more and 60 mass % or less.

The content of the conjugated diene compound polymer block and/or the hydrogenated block thereof (Sb) (preferably, ethylene-butylene) in the styrene-based thermoplastic elastomer is not particularly limited, and is, for example, 20 mass % or more and 95 mass % or less. From the viewpoint of dielectric breakdown strength at high temperatures, folding resistance, etc., it is preferably 20 mass % or more and 75 mass % or less, more preferably 30 mass % or more and 70 mass % or less, and even more preferably 40 mass % or more and 65 mass % or less.

The melt mass flow rate of the styrene-based thermoplastic elastomer is not particularly limited, and is, for example, 0.5 to 15 g/10 min. The melt mass flow rate is preferably 1 to 10 g/10 min, more preferably 1.5 to 5 g/10 min, and even more preferably 2 to 4 g/10 min. The melt mass flow rate is measured according to JIS K 7210:1999 (condition: 230° C., load: 2.16 kg).

The styrene-based thermoplastic elastomer is available as a commercial product, or can be produced by a known method. As the styrene-based thermoplastic elastomer, for example, TUFTEC(registered trademark) series (e.g., H1517) produced by Asahi Kasei Corporation, SEPTON (registered trademark) series (e.g., 8000 series) produced by Kuraray Co., Ltd., or the like can be suitably used.

The styrene-based thermoplastic elastomers can be used singly or in combination of two or more.

When the resin composition of the present invention contains a styrene-based thermoplastic elastomer, the content of the styrene-based thermoplastic elastomer is not particularly limited; however, the content of the elastomer is preferably lower than the content of the syndiotactic polystyrene resin (preferably lower than the content of each of the syndiotactic polystyrene resin and polyphenylene ether resin; in a preferred embodiment in which an atactic polystyrene resin is contained, lower than the content of each of the syndiotactic polystyrene resin, polyphenylene ether resin, and atactic polystyrene resin) in the resin composition of the present invention.

When the resin composition of the present invention contains a styrene-based thermoplastic elastomer, the content of the styrene-based thermoplastic elastomer in the resin composition of the present invention is, for example, 1 mass % or more and 20 mass % or less, preferably 1.5 mass % or more and 18 mass % or less, more preferably 1.8 mass % or more and 15 mass % or less, even more preferably 2 mass % or more and 12 mass % or less, still even more preferably 2.5 mass % or more and 9 mass % or less, and particularly preferably 2.8 mass % (or 2.7 mass %) or more and 8 mass % or less, from the viewpoint of dielectric breakdown strength at high temperatures, folding resistance, etc. In a preferred embodiment of the present invention, from the same viewpoint as above, the content is still even more preferably 2.5 mass % or more and 7 mass % (or 5 mass %) or less, and particularly preferably 4 mass % or more and 6 mass % or less.

When the resin composition of the present invention contains a styrene-based thermoplastic elastomer, the content of the styrene monomer polymer block unit (Hb) in the resin composition of the present invention is not particularly limited. From the viewpoint of dielectric breakdown strength at high temperatures, folding resistance, etc., it is preferably 0.5 mass % or more and 10 mass % or less, more preferably 1 mass % or more and 5 mass % or less, and even more preferably 1.5 mass % or more and 4 mass % or less. In a preferred embodiment of the present invention, from the same viewpoint as above, the content is more preferably 0.9 mass % or more and 5 mass % or less, even more preferably 1 mass % or more and 4 mass % or less, and still even more preferably 1 mass % or more and 2 mass % or less.

The content of styrene components (the total of all styrene components derived from the styrene monomer polymer block unit (Hb), syndiotactic polystyrene resin, polystyrene resin other than the syndiotactic polystyrene resin (e.g., an atactic polystyrene resin), etc.) in the resin composition of the present invention is not particularly limited. From the viewpoint of dielectric breakdown strength at high temperatures, folding resistance, etc., it is preferably 50 mass % or more and less than 94 mass %, more preferably 60 mass % or more and 90 mass % or less, even more preferably 65 mass % or more and 80 mass % or less, and particularly preferably 69 mass % or more and 79 mass % or less.

When the resin composition of the present invention contains a styrene-based thermoplastic elastomer, the content of the conjugated diene compound polymer block and/or the hydrogenated block thereof (Sb) (preferably ethylene-butylene) in the resin composition of the present invention is not particularly limited. From the viewpoint of dielectric breakdown strength at high temperatures, folding resistance, etc., it is preferably 1 mass % or more and 10 mass % or less, more preferably 1.2 mass % or more and 6 mass % or less, even more preferably 1.5 mass % or more and 5.5 mass % or less, and still even more preferably 2 mass % or more and 5 mass % or less. In a preferred embodiment of the present invention, from the same viewpoint as above, the content is more preferably 1 mass % or more and 6 mass % or less, even more preferably 1.2 mass % or more and 4.5 mass % or less, and still even more preferably 1.2 mass % or more and 2.5 mass % or less.

In a preferred embodiment, the resin composition of the present invention contains an atactic polystyrene resin.

The atactic polystyrene resin is not particularly limited as long as it is an amorphous resin containing polystyrene having an atactic structure as the main chain. As the atactic polystyrene resin, 90% or more, and preferably 95% or more, of the structural units constituting the main chain is preferably styrene and/or styrene having a substituent on the aromatic ring.

The atactic structure refers to a three-dimensional structure in which phenyl groups and substituted phenyl groups, which are side chains, are random with respect to the main chain formed from carbon-carbon bonds. Tacticity is generally quantified by an isotopic carbon nuclear magnetic resonance method ($^{13}$C-NMR method), and can be indicated by the proportion of continuous structural units, for example, a diad for two units, a triad for three units, and a pentad for five units. The atactic polystyrene resin, for example, in terms of a racemic diad, has a syndiotacticity of, for example, less than 75%, and preferably 65% or less. Further, the atactic polystyrene resin, for example, in terms of a racemic pentad, has a syndiotacticity of, for example, less than 30%, and preferably 25% or less.

Specific examples of the atactic polystyrene resin include polystyrene, poly(alkylstyrene), poly(halogenated styrene), poly(halogenated alkylstyrene), poly(alkoxystyrene), and mixtures thereof, or copolymers containing these as main components, and the like.

Examples of the poly(alkylstyrene) include poly(methylstyrene), poly(ethylstyrene), poly(isopropylstyrene), poly(tertiary butylstyrene), poly(phenylstyrene), poly(vinyl styrene), poly(vinyl naphthalene), and the like. Examples of the poly(halogenated styrene) include poly(chlorostyrene), poly(bromostyrene), poly(fluorostyrene), and the like. Examples of the poly(halogenated alkylstyrene) include poly(chloromethylstyrene) and the like. Examples of the poly(alkoxystyrene) include poly(methoxystyrene), poly(ethoxystyrene), and the like.

Particularly preferred atactic polystyrene resins among these are polystyrene, poly(p-methylstyrene), poly(m-methylstyrene), poly(p-tertiary butylstyrene), poly(p-chlorostyrene), poly(m-chlorostyrene), poly(p-fluorostyrene), hydrogenated polystyrene, styrene-alkylstyrene copolymers such as a copolymer of styrene and p-methylstyrene, and the like.

The melt mass flow rate of the atactic polystyrene resin is not particularly limited, and is, for example, 0.5 to 20 g/10 min. The melt mass flow rate is preferably 2 to 15 g/10 min, more preferably 4 to 12 g/10 min, and even more preferably 6 to 9 g/10 min. The melt mass flow rate is measured according to ISO 1133 (condition: 200° C., load: 5 kgf, test piece: pellets).

The temperature of deflection under load of the atactic polystyrene resin is not particularly limited, and is, for example, 65° C. or higher and 90° C. or lower, and preferably 70° C. or higher and 80° C. or less. The temperature of deflection under load is measured according to ISO 75-2 (conditions: flatwise, 1.8 MPa, test piece: 80 mm×10 mm×4 mm).

The atactic polystyrene resin is available as a commercial product, or can be produced by a known method. As commercial products of the atactic polystyrene resin, resins generally called general-purpose polystyrene (GPPS) can be suitably used, and are available as, for example, "PSJ-Polystyrene GPPS" (HF77, 679, SGP10, etc.) produced by PS Japan Corporation.

The atactic polystyrene resins can be used singly or in combination of two or more.

When the resin composition of the present invention contains an atactic polystyrene resin, the content of the atactic polystyrene resin is not particularly limited; however, the content of the resin is preferably lower than the content of the syndiotactic polystyrene resin (preferably lower than the content of each of the syndiotactic polystyrene resin and polyphenylene ether resin) in the resin composition of the present invention.

When the resin composition of the present invention contains an atactic polystyrene resin, the content of the atactic polystyrene resin in the resin composition of the present invention is, for example, 2 mass % or more and 20 mass % or less, preferably 5 mass % or more and 20 mass % or less, more preferably 6 mass % or more and 15 mass % or less, and even more preferably 8 mass % or more and 11 mass % or less, from the viewpoint of dielectric breakdown strength at high temperatures, folding resistance, etc.

The resin composition of the present invention may contain other resins, additives, and the like, in addition to the above components.

When the resin composition of the present invention contains other resins, the content of the other resins in the resin composition is, for example, 20 mass % or less, preferably 15 mass % or less, and more preferably 10 mass % or less.

From the viewpoint of dielectric breakdown strength at high temperatures, the resin composition of the present invention preferably has a low content of a high-impact polystyrene resin and/or an ABS resin, or does not contain a high-impact polystyrene resin and/or an ABS resin. Examples of high-impact polystyrene resins include a graft copolymer obtained by graft-polymerizing a styrene monomer to a stem polymer of polybutadiene and a styrene-butadiene random copolymer. The ABS resin is a copolymer synthetic resin of acrylonitrile, butadiene, and styrene. When the resin composition of the present invention contains a high-impact polystyrene resin and/or an ABS resin, the content of the high-impact polystyrene resin and/or the ABS resin in the resin composition is preferably 8 mass % or less, more preferably 5 mass % or less, even more preferably 2 mass % or less, still even more preferably 1 mass % or less, and particularly preferably 0.1 mass % or less, from the viewpoint of dielectric breakdown strength at high temperatures, folding resistance, etc.

The additives are not particularly limited, and examples include components that can be mixed into resin films (in particular, capacitor resin films). Specific examples include antioxidants, chlorine absorbers, lubricants, plasticizers, flame retardants, colorants, and the like. When the resin composition of the present invention contains additives, the content of the additives in the resin composition is, for example, 10 mass % or less, 5 mass % or less, 1 mass % or less, 0.5 mass % or less, or 0.1 mass % or less.

The state of the resin composition of the present invention is not particularly limited. The state of the resin composition of the present invention is, for example, solid (e.g., aggregates of resin masses of any size, including pellets and powders), liquid (e.g., a molten mixture of the components), or the like.

The resin composition of the present invention preferably contains a blend resin obtained by blending some or all of the components in a molten state (including a polymer alloy), from the viewpoint of dielectric breakdown strength at high temperatures, folding resistance, etc.

The resin composition of the present invention preferably contains a modified polyphenylene ether as a blend resin containing a polyphenylene ether resin, from the viewpoint of dielectric breakdown strength at high temperatures, folding resistance, etc. The modified polyphenylene ether is a resin obtained by melt-kneading (polymer-alloying) a polyphenylene ether resin and another resin. The modified polyphenylene ether is preferred because of its excellent melt flowability and extrusion moldability.

Examples of other resins that constitute the modified polyphenylene ether include polystyrene resins, styrene-based thermoplastic elastomers, polypropylene resins, polyphenylene sulfide resins, polyamide resins, and the like. Preferred among these are polystyrene resins (preferably atactic polystyrene resins), styrene-based thermoplastic elastomers, etc., from the viewpoint of dielectric breakdown strength at high temperatures, folding resistance, etc.

The composition ratio of each resin that constitutes the modified polyphenylene ether is not particularly limited, and can be appropriately adjusted depending on the type of resin. The content of the polyphenylene ether resin in the modified polyphenylene ether is, for example, 40 mass % or more and 98 mass % or less, preferably 50 mass % or more and 97 mass % or less, and more preferably 60 mass % or more and 96 mass % or less. The content of other resins in the modified polyphenylene ether is, for example, 2 mass % or more and 60 mass % or less, preferably 3 mass % or more and 50 mass % or less, and more preferably 4 mass % or more and 40 mass % or less. For example, when the other resin that constitutes the modified polyphenylene ether is a polystyrene resin, the content of the polyphenylene ether resin in the modified polyphenylene ether is, for example, 40 mass % or more and 90 mass % or less, preferably 50 mass % or more and 85 mass % or less, and more preferably 60 mass % or more and 80 mass % or less. The content of the polystyrene resin in the modified polyphenylene ether is, for example, 10 mass % or more and 60 mass % or less, preferably 15 mass % or more and 50 mass % or less, and more preferably 20 mass % or more and 40 mass % or less. For example, when the other resin that constitutes the modified polyphenylene ether is a styrene-based thermoplastic elastomer, the content of the polyphenylene ether resin in the modified polyphenylene ether is, for example, 80 mass % or more and 98 mass % or less, preferably 85 mass % or more and 97 mass % or less, and more preferably 90 mass % or more and 96 mass % or less. The content of the styrene-based thermoplastic elastomer in the modified polyphenylene ether is, for example, 2 mass % or more and 20 mass % or less, preferably 3 mass % or more and 15 mass % or less, and more preferably 4 mass % or more and 10 mass % or less.

The temperature of deflection under load (Method A of JIS K 7191: 2007) of the modified polyphenylene ether is not particularly limited. From the viewpoint of dielectric breakdown strength at high temperatures, folding resistance, etc., it is, for example, 80° C. or higher and 250° C. or lower, preferably 100° C. or higher and 230° C. or lower, more preferably 130° C. or higher and 210° C. or lower, and even more preferably 160° C. or higher and 200° C. or less.

The melt mass flow rate (JIS K 7210: 1999, provided that measurement temperature: 300° C., load: 5.00 kg) of the modified polyphenylene ether is not particularly limited. From the viewpoint of extrusion moldability and continuous stretchability, it is preferably 1 to 20 g/10 min, and more preferably 2 to 10 g/10 min.

The modified polyphenylene ether is available as a commercial product, or can be produced by a known method. As commercial products thereof, for example, Iupiace (registered trademark) series (e.g., Iupiace (registered trademark) AH91) produced by Mitsubishi Engineering-Plastics Corporation, ZYRON (registered trademark) series (e.g., ZYRON (registered trademark) 1000H) produced by Asahi Kasei Corporation, NORYL(registered trademark) series produced by SHPP Japan LLC., or the like can be preferably used.

The modified polyphenylene ethers can be used singly or in combination of two or more.

The content of the modified polyphenylene ether is not particularly limited as long as the content of the polyphenylene ether resin in the resin composition of the present invention is finally 6 mass % or more. The content of the modified polyphenylene ether in the resin composition of the present invention is, for example, 5 mass % or more and 50 mass % or less, preferably 10 mass % or more and 45 mass % or less, and more preferably 15 mass % or more and 40 mass % or less.

When the resin composition of the present invention contains a styrene-based thermoplastic elastomer, the resin composition of the present invention may contain the styrene-based thermoplastic elastomer alone; however, from the viewpoint of dielectric breakdown strength at high temperatures, folding resistance, etc., it preferably contains a blend resin containing a styrene-based thermoplastic elastomer (blend resin X) as a blend resin containing a styrene-based thermoplastic elastomer. The blend resin X preferably further contains a syndiotactic polystyrene resin and/or a polyphenylene ether resin, from the viewpoint of dielectric breakdown strength at high temperatures, folding resistance, etc. More specifically, when the resin composition of the present invention contains a styrene-based thermoplastic elastomer, the resin composition of the present invention preferably contains the styrene-based thermoplastic elastomer in a molten state together with a syndiotactic polystyrene resin and/or a polyphenylene ether resin. Further, the resin composition of the present invention preferably contains (1) styrene-based thermoplastic elastomer- and syndiotactic polystyrene resin-containing molten pellets, and/or (2) styrene-based thermoplastic elastomer- and polyphenylene ether resin-containing molten pellets.

The composition ratio of each resin that constitutes the blend resin X is not particularly limited, and can be appropriately adjusted depending on the type of resin. From the viewpoint of dielectric breakdown strength at high temperatures, folding resistance, etc., the content of the syndiotactic polystyrene resin in the blend resin X is preferably 60 mass % or more and 95 mass % or less, and more preferably 70 mass % or more and 90 mass % or less. From the same viewpoint, the content of the styrene-based thermoplastic elastomer in the blend resin X is preferably 5 mass % or more and 40 mass % or less, and more preferably 10 mass % or more and 30 mass % or less. From the same viewpoint, the content of the polyphenylene ether resin in the blend resin X is preferably 0 mass % or more and 10 mass % or less, more preferably 1 mass % or more and 10 mass % or less, and even more preferably 2 mass % or more and 5 mass % or less.

The blend resin X can be obtained by melt-kneading each component. As the melt-kneading method, a single-screw melt kneader, a twin-screw melt kneader, or a multi-screw melt kneader with more than two screws can be used. Of these, a twin-screw melt kneader is highly effective to improve the fragility of the film, and is suitably used. In the case of a twin-screw melt kneader, both same-direction rotation and different-direction rotation types of kneading can be used; however, same-direction rotation is preferred, from the viewpoint of preventing resin deterioration. The ratio of length to diameter (L/D) of the screw is preferably 25 or more, more preferably 30 or more, and even more preferably 35 or more. An L/D of 25 or more tends to increase the effect of improving the folding resistance of the film. There is no upper limit on L/D; however, from the viewpoint of preventing resin deterioration, L/D is 100 or less, and preferably 80 or less.

The temperature during melt-kneading is preferably 250° C. to 350° C., and more preferably 280° C. to 320° C., in terms of the balance between prevention of resin deterioration and dispersibility. During melt-kneading, to prevent resin deterioration, it is preferable to purge the kneader with an inert gas such as nitrogen.

The blend resins X can be used singly or in combination of two or more.

When the resin composition of the present invention contains a styrene-based thermoplastic elastomer, the content of the blend resin X is not particularly limited as long as the content of the polyphenylene ether resin in the resin composition of the present invention is finally 6 mass % or more. The content of the blend resin X in the resin composition of the present invention is, for example, 5 mass % or more and 60 mass % or less, preferably 15 mass % or more and 45 mass % or less, and more preferably 20 mass % or more and 35 mass % or less. In another preferred embodiment, the content is preferably 10 mass % or more and 45 mass % or less, and more preferably 12 mass % or more and 25 mass % or less.

Due to the use of the resin composition of the present invention described above, films with higher dielectric breakdown strength at high temperatures and folding resistance can be obtained.

2. Film

In one embodiment, the present invention relates to a film comprising a film-like layer of the resin composition of the present invention (in the present specification, also referred to as "the film of the present invention"). This is described below.

The film of the present invention can be obtained by a method comprising the step of molding the resin composition of the present invention into a film-like shape. The film of the present invention can be obtained, for example, by extruding the resin composition of the present invention into a film-like shape (the film of the present invention obtained thereby is also referred to as "the unstretched film of the present invention"), or by biaxially stretching the unstretched film of the present invention (the film of the present invention obtained thereby is also referred to as "the biaxially stretched film of the present invention").

The method for extruding the resin composition of the present invention is not particularly limited, and a known extrusion method can be used. For example, the resin composition of the present invention in a solid state supplied into an extruder is melted by heating, filtered through a filter, then extruded through a T-die into a film-like shape, and solidified by contact with a cooling roll set at a predetermined surface temperature for molding. The unstretched film of the present invention can be obtained as a wound product by molding it into a film-like shape and then winding it around a winding core.

The resin composition of the present invention is preferably mixed before melting. The mixing method is not particularly limited, and is, for example, a method of dry-blending multiple types of resin masses (pellets etc.) using a mixer or the like.

The resin composition of the present invention is preferably dried before melting. The drying conditions are not particularly limited. The drying temperature is not particularly limited, and is, for example, 70 to 150° C., and preferably 80 to 130° C. The drying time can be appropriately adjusted depending on the drying temperature, and is, for example, 2 to 50 hours, and preferably 3 to 20 hours.

The resin composition of the present invention is generally melted using an extruder. As the extruder, for example, a single-screw extruder, a twin-screw extruder, or a multi-screw extruder with more than two screws can be used. In the case of a twin- or multi-screw extruder, examples of the type of screw rotation include same-direction rotation, different-direction rotation, and the like. The melting temperature is not particularly limited, and is, for example, 230 to 400° C., preferably 280 to 380° C., and more preferably 310 to 350° C. In order to suppress the deterioration of the resin during kneading and mixing, it is preferable to purge the kneader with an inert gas such as nitrogen.

The filtration accuracy of the filter for filtering the resin composition of the present invention in a molten state is not particularly limited, and is, for example, 2 to 20 μm, preferably 3 to 10 μm, and more preferably 3 to 7 μm.

The temperature during extrusion through the T-die is not particularly limited, and is, for example, 200 to 400° C., preferably 250 to 350° C., and more preferably 280 to 320° C.

The adhesion method when solidifying the film-like material extruded from the T-die by contact with a cooling roll is not particularly limited, and examples include air knife, electrostatic pinning, elastic roll nip, metal roll nip, elastic metal roll nip, and the like. The surface temperature of the cooling roll is not particularly limited, and is, for example, 40 to 100° C., and preferably 50 to 80° C.

The thickness of the unstretched film of the present invention is not particularly limited, and is, for example, 10 to 100 μm, and preferably 20 to 60 μm.

The method for biaxially stretching the unstretched film of the present invention is not particularly limited, and known biaxial stretching methods can be used. For example, the unstretched film of the present invention is heated using a heating roll, stretched in the machine direction (MD), then stretched in the traverse direction (TD) at a predetermined temperature, then heat-fixed at a predetermined temperature, and relaxed in the traverse direction for cooling.

The temperature of the heating roll before stretching in the machine direction is not particularly limited, and is, for example, 100 to 160° C., and preferably 115 to 145° C. The stretching ratio in the machine direction is not particularly limited, and is, for example, 1.5- to 4.5-fold, and preferably 2.5- to 4-fold.

The temperature during stretching in the traverse direction is not particularly limited, and is, for example, 120 to 180° C., and preferably 135 to 170° C. The stretching ratio in the traverse direction is not particularly limited, and is, for example, 2- to 5-fold, and preferably 3- to 4.5-fold.

The temperature of heat fixation is not particularly limited, and is, for example, 200 to 280° C., and preferably 230 to 260° C. The time of heat fixation is not particularly limited, and is, for example, 5 to 20 seconds.

The temperature during relaxation (relief) in the traverse direction is not particularly limited, and is, for example, 100 to 160° C., and preferably 120 to 140° C. The relaxation (relief) rate in the traverse direction is not particularly limited, and is, for example, 1 to 5%, and preferably 2 to 4%.

The thickness of the biaxially stretched film of the present invention is not particularly limited, and is, for example, 30 μm or less, or 20 μm or less. The thickness is preferably thinner, from the viewpoint of reducing the volume of the capacitor and increasing capacitance. From this point of view, the thickness is preferably 10 μm or less, more preferably 9.5 μm or less, even more preferably 8 μm or less, still even more preferably 6 μm or less, especially preferably 5 μm or less, especially even more preferably 4 μm or less, and particularly preferably 3 μm or less. Further, the thickness is, for example, 1 μm or more, preferably 1.5 μm or more, more preferably 1.8 μm or more, even more preferably 2 μm or more, still even more preferably 2.3 μm or more, and particularly preferably 2.5 μm or more, from the viewpoint of further enhancing dielectric breakdown strength and slit processing suitability, and further improving continuous film-forming properties. The thickness range of the biaxially stretched film of the present invention can be set by freely combining the above upper and lower limits.

The thickness of the films of the present invention, such as the unstretched film of the present invention and the biaxially stretched film of the present invention, is measured using an outer micrometer (High Precision Digimatic Micrometer MDH-25 MB, produced by Mitutoyo Corporation) according to Method A of JIS K 7130: 1999.

The layer structure of the film of the present invention is not particularly limited. The film of the present invention may be a single layer consisting of one layer, or may be multiple layers having the same or different compositions. The film of the present invention is preferably a film comprising a single or multiple film-like layers of the resin composition of the present invention, and more preferably a single-layer film (a film comprising a single film-like layer of the resin composition of the present invention).

The films of the present invention (in particular, the unstretched film of the present invention) have excellent folding resistance. The folding resistance is evaluated according to the method of the Examples described later. The number of test pieces with cracks measured by that method is preferably 1 or less, and more preferably 0.

The films of the present invention (in particular, the biaxially stretched film of the present invention) have excellent dielectric breakdown strength (in particular, dielectric breakdown strength at high temperatures). The dielectric breakdown strength is measured according to the measurement method of the Examples described later.

The dielectric breakdown strength of the films of the present invention in a 23° C. environment is preferably 470 $V_{DC}$/μm or more, more preferably 500 $V_{DC}$/μm or more, even more preferably 510 $V_{DC}$/μm or more, still even more preferably 520 $V_{DC}$/μm more, and particularly preferably 530 $V_{DC}$/μm or more.

The dielectric breakdown strength of the films of the present invention in a 120° C. environment is preferably 470 $V_{DC}$/μm or more, more preferably 490 $V_{DC}$/μm or more, even more preferably 500 $V_{DC}$/μm or more, still even more preferably 510 $V_{DC}$/μm more, and particularly preferably 520 $V_{DC}$/μm or more.

The dielectric breakdown strength of the films of the present invention in a 150° C. environment is preferably 450 $V_{DC}$/μm or more, more preferably 480 $V_{DC}$/μm or more, even more preferably 490 $V_{DC}$/μm or more, still even more preferably 500 $V_{DC}$/μm more, and particularly preferably 520 $V_{DC}$/μm or more.

The upper limit of dielectric breakdown strength at each of the above-mentioned temperatures is not particularly limited, and is, for example, 650 $V_{DC}$/μm, 620 $V_{DC}$/μm, 600 $V_{DC}$/μm, 580 $V_{DC}$/μm, or 560 $V_{DC}$/μm.

In the films of the present invention (in particular, the biaxially stretched film of the present invention), the rate of change in dielectric breakdown strength due to temperature rise is smaller.

The ratio of the dielectric breakdown strength in a 120° C. environment to the dielectric breakdown strength in a 23° C. environment (dielectric breakdown strength in 120° C. environment/dielectric breakdown strength in 23° C. environment) is preferably 0.92 or more, more preferably 0.94 or more, even more preferably 0.95 or more, still even more preferably 0.96 or more, especially preferably 0.97 or more, and particularly preferably 0.98 or more.

The ratio of the dielectric breakdown strength in a 150° C. environment to the dielectric breakdown strength in a 23° C.

environment (dielectric breakdown strength in 150° C. environment/dielectric breakdown strength in 23° C. environment) is preferably 0.88 or more, more preferably 0.9 or more, even more preferably 0.92 or more, still even more preferably 0.94 or more, especially preferably 0.96 or more, and particularly preferably 0.97 or more.

The ratio of the dielectric breakdown strength in a 150° C. environment to the dielectric breakdown strength in a 120° C. environment (dielectric breakdown strength in 150° C. environment/dielectric breakdown strength in 120° C. environment) is preferably 0.92 or more, more preferably 0.94 or more, even more preferably 0.95 or more, still even more preferably 0.96 or more, especially preferably 0.97 or more, and particularly preferably 0.98 or more.

The 120° C. environment and the 150° C. environment are generally very different in the load related to dielectric breakdown strength, even though they are the same "high-temperature" environments. According to the present invention, higher dielectric breakdown strength can be exhibited and/or maintained even in an environment with a large load of 150° C.

The upper limit of each of the above-mentioned ratios is not particularly limited, and is, for example, 1.1, 1.05, or 1.0.

The use of the films of the present invention is not particularly limited. The films of the present invention can be used as, for example, heat-resistant films by taking advantage of their heat resistance. Further, the films of the present invention (in particular, the biaxially stretched film of the present invention) can be suitably used as capacitor films that can exhibit their characteristics (dielectric breakdown strength and folding resistance). In particular, the films of the invention (in particular, the biaxially stretched film of the present invention) can be extremely suitably used for capacitors that are used in high-temperature environments, and that have a small size and a high capacity (e.g., 5 µF or more, preferably 10 µF or more, and even more preferably 20 µF or more).

3. Capacitor Metallized Film

In one embodiment, the present invention relates to a capacitor metallized film having a metal film on one side or both sides of the film of the present invention (in the present specification, also referred to as "the metallized film of the present invention"). This is described below.

An electrode can be attached to one side or both sides of the film of the present invention for processing as a capacitor. The electrode is not particularly limited as long as the capacitor targeted by the present invention can be obtained. However, since the capacitor is required to be smaller and lighter, it is preferable to form (metallize) an electrode directly on one side or both sides of the film of the present invention to form a metallized film.

As the method for metallizing the surface of the film of the present invention, a metal layer (electrode) is provided, for example, by vacuum plating such as metal vapor deposition or sputtering, coating and drying of metal-containing paste, or crimping of metal foil or metal powder. In particular, a vacuum deposition method and a sputtering method are preferred, in order to meet the further demand for smaller and lighter capacitors, and a vacuum deposition method is preferred, from the viewpoint of productivity, economy, etc. Examples of the vacuum deposition method generally include a crucible method and a wire method; however, it is not particularly limited as long as the capacitor targeted by the present invention can be obtained, and an optimal method can be appropriately selected.

The metal used in the electrode can be, for example, an elemental metal such as zinc, lead, silver, chromium, aluminum, copper, or nickel, or a mixture of two or more of these metals, or an alloy thereof. However, zinc and aluminum are preferred, in consideration of environment, economy, capacitor performance, etc.

The film resistance of the electrode is preferably about 1 to $100\Omega/\square$ from the viewpoint of the electrical properties of the capacitor. From the viewpoint of self-healing characteristics, the film resistance is preferably relatively high within this range, more preferably $5\Omega/\square$ or more, and even more preferably $10\Omega/\square$ or more. From the viewpoint of safety as a capacitor, the film resistance is more preferably $50\Omega/\square$ or less, and even more preferably $30\Omega/\square$ or less.

When forming an electrode (metal deposition film) by a vacuum deposition method, the film resistance thereof can be measured during vapor deposition by, for example, four-terminal sensing known to one skilled in the art. The film resistance of the metal deposition film can be controlled by adjusting the evaporation amount by conditioning the output of the evaporation source, for example.

When the metal deposition film is formed on one side of the film, a portion of a predetermined width from one edge of the film is not vapor-deposited to form an insulation margin so that the film becomes a capacitor when wound. In addition, to tightly connect the metallized film and the metallikon electrode, a heavy edge structure is preferably formed on the other edge, not the edge with the insulation margin. The film resistance of the heavy edge is typically about 1 to $8\Omega/\square$, and more preferably about 1 to $5\Omega/\square$. The thickness of the heavy edge metal film is not particularly limited, but is preferably 1 to 200 nm.

The vapor deposition pattern (margin pattern) of the metal deposition film to be formed is not particularly limited; however, it is preferable to form a fuse as a pattern including a special margin, such as a fishnet pattern or T-margin pattern, from the viewpoint of improving the characteristics, such as safety of the capacitor. Forming a metal deposition film in a vapor deposition pattern including a special margin on at least one side of the film of the present invention is preferable because it is effective, for example, in terms of improving the safety of the resulting capacitor and reducing the breakage and/or short circuit of the capacitor.

The method for foaming the margin can be any known method with no restrictions, including a tape method in which masking is done with tape during vapor deposition and an oil method in which masking is done by applying oil.

On the metallized film of the present invention, a protective layer may be provided for the purpose of physical protection, moisture absorption prevention, oxidation prevention, etc., of the metal deposition film. As the protective layer, silicone oil, fluorine oil, or the like can be preferably used.

The metallized film of the present invention can be processed into the capacitor of the present invention described later. The metallized film of the present invention can be used as, for example, a barrier film for oxygen and other gases.

4. Capacitor

In one embodiment, the present invention relates to a capacitor comprising the film and/or metallized film of the present invention (in the present specification, also referred to as "the capacitor of the present invention"). This is described below.

In such a capacitor, the film of the present invention can constitute a capacitor as a capacitor dielectric film by, for example, (i) a method using the above metallized film, or (ii) laminating the film of the present invention without electrodes and another conductor (e.g., metal foil, the film of the present invention metallized on one or both sides, or paper and other plastics metallized on one or both sides).

In the step of preparing a capacitor, winding processing of the film is performed. For example, two metallized films of the present invention are laminated such that the metal film in the metallized film of the present invention and the film of the present invention are alternately overlaid, or additionally such that the insulation margin of each film is located, one on one side, and the other on the other side. The laminated pair of films is then wound. In this step, it is preferable to laminate the pair of two metallized films of the present invention with a shift of 1 to 2 mm. The winder to be used is not particularly limited, and the Automatic Winder 3KAW-N2, produced by Kaido Mfg. Co., Ltd., for example, can be used.

The winding processing of the film is not limited to the above method. Alternatively, for example, the film of the present invention with double-sided vapor deposition (in this case, heavy edges are arranged at opposite ends on the front and back surfaces) and the film of the present invention without vapor deposition (whose width is 2 to 3 mm narrower than that of the film of the present invention with double-sided vapor deposition) may be alternately laminated and then wound.

In preparing a flat capacitor, after the winding, the obtained wound product is typically pressed. Pressing helps to tighten the roll of the capacitor and/or to form the element. From the viewpoint of controlling and/or stabilizing the gap between the layers, the applied pressure is 2 to 20 kg/cm$^2$, although the optimum value varies depending on, for example, the thickness of the film of the present invention.

Subsequently, both edge faces of the wound product are subjected to metal thermal spraying to form metallikon electrodes, thereby preparing a capacitor.

The capacitor is further subjected to a predetermined heat treatment. Specifically, the present invention includes the step of performing heat treatment on the capacitor (which may be, hereinafter, referred to as "heat aging"). The temperature of the heat treatment is, for example, 80 to 190° C., but is not particularly limited thereto. The method of performing the heat treatment on the capacitor may be appropriately selected from known methods including, for example, a method using a constant temperature bath in a vacuum atmosphere, and a method using high frequency induction heating. The time for performing the heat treatment is preferably 1 hour or more, and more preferably 10 hours or more, in terms of obtaining mechanical and thermal stability. In terms of preventing defects in molding such as heat wrinkles and patterning, the time is more preferably 20 hours or less.

Performing the heat treatment can provide the effect of heat aging. Specifically, the gap between the films constituting the capacitor formed from the metallized films of the present invention decreases, thereby suppressing corona discharge and facilitating the crystallization due to the alteration of the internal structure of the metallized films of the present invention. This appears to result in improving the voltage resistance. A temperature of the heat treatment lower than the predetermined temperature cannot sufficiently achieve the effect of the heat aging. On the other hand, a temperature of the heat treatment higher than the predetermined temperature may cause, for example, pyrolysis or oxidative degradation of the films of the present invention.

Lead wires are typically welded to the metallikon electrodes of a capacitor that has undergone heat aging. The capacitor is preferably encapsulated in a case and potted in epoxy resin to impart weatherability to the capacitor and, in particular, to prevent degradation of the capacitor by moisture.

The capacitor of the present invention using the film of the present invention is suitably used in a high-temperature environment, and can be a capacitor that has a small size and a high capacity (e.g., 5 µF or more, preferably 10 µF or more, and even more preferably 20 µF or more). Therefore, the capacitor of the present invention can be used as a high-voltage capacitor, a filter capacitor for various switching power supplies, converters, and inverters, a smoothing capacitor, or the like, all of which are used in electronic devices, electrical devices etc. In addition, the capacitor of the present invention can also be suitably used as an inverter capacitor, a converter capacitor, or the like that controls the drive motor of an electric vehicle or a hybrid vehicle, for which demand is increasing in recent years.

EXAMPLES

The present invention is described in detail below based on Examples; however, the present invention is not limited by these Examples.

(1) Measurement Method and Evaluation Method

Various measurement methods and evaluation methods are as described below.
(1-1) Evaluation of Folding Resistance of Unstretched Film The folding resistance of the unstretched films of the Examples and Comparative Examples was evaluated in the following manner. Five test pieces (5 cm in the traverse direction and 10 cm in the machine direction) were cut from the center of the unstretched film in the traverse direction. The cut test pieces were each folded in half so that the short sides overlapped, and a weight of 300 g, with a rectangular base of 5 cm×10 cm, was placed on the folded part. At that time, it was visually confirmed whether the folded part of the test piece was broken and separated, or remained connected without breaking. A test piece in which 2 cm or more of the 5-cm folded part was cracked was counted as cracked, and the evaluation was carried out according to the following evaluation criteria based on the number of cracked test pieces.
Evaluation Criteria
　○: 0 test pieces; hardly crack, and good film-forming properties
　Δ: 1 test piece; easily crack, but able to form a film
　X: 2 or more test pieces; easily crack, and inferior film-forming properties
(1-2) Evaluation of Dielectric Breakdown Strength of Biaxially
Stretched Film at High Temperature The dielectric breakdown strength of the biaxially stretched films of the Examples and Comparative Examples at high temperatures was evaluated in the following manner. A measurement device was prepared according to 17.2.2 (plate electrode method) of JIS C2151: 2006. However, conductive rubber (E12510, produced by Seiwa Electric Mfg. Co., Ltd.) was used as the lower electrode in place of the elastic material described in 17.2.2 of JIS C2151: 2006, and no aluminum foil was wrapped around the electrode. The measurement environment was inside a forced circulation oven with a set temperature of 120° C. or 150° C., and the electrode and film were warmed for 30 minutes in the oven before use. The voltage increase started at 0 V at a rate of 100 V/sec, and the time of breakdown was defined as the time when the current value exceeded 5 mA. The number of times of measurement of dielectric breakdown voltage was 20. The dielectric breakdown voltage value $V_{DC}$ was divided by the thickness (μm) of the film, and the average value of 16 points, excluding the top two and bottom two points of the 20 calculations, was used as the breakdown strength ($V_{DC}$/μm).

(1-3) Evaluation of Dielectric Breakdown Strength of Biaxially Stretched Film at Room Temperature The evaluation was carried out in the same manner as in (1-2) above, except that the measurement environment was not inside the forced circulation oven with a set temperature of 120° C. or 150° C., but in an environment with a temperature of 23° C. and a relative humidity of 50%

(1-4) Measurement of Ethylene-Butylene Content of SEBS

The ethylene-butylene content of a SEBS-type hydrogenated styrene-based thermoplastic elastomer, which was the resin used in the Examples and Comparative Examples, was measured as follows. SEBS dissolved in heavy chloroform ($CDCl_3$) was used as a sample for measurement, and $^1$H-NMR measurements were performed under the following conditions. The ethylene-butylene content was determined by identifying the contained components from the measured signals, determining the integrated intensity ratio (molar ratio) per H atom of each contained component, and converting it to weight ratio according to the formula weight of each component.

$^1$H-NMR Measurement
  Measurement device: AVANCE III-600 with Cryo Probe, produced by Bruker BioSpin
  Measurement frequency: 600 MHz
  Measurement solvent: $CDCl_3$
  Measurement temperature: 300 K
  Chemical shift standard: $CDCL_3$ ($^1$H; 7.25 ppm).

(1-5) Measurement and Calculation of Content of Each Component in Biaxially Stretched Film The content of each component in the biaxially stretched films of the Examples and Comparative Examples was calculated from the component content of each raw material used, if known, and the mixing ratio of the raw materials. When a blend resin with an unknown component content and/or a modified polyphenylene ether with an unknown component content were used as raw materials, the content of each component in the biaxially stretched films was calculated from the content of each component in the raw materials measured by the following method, and the mixing ratio of the raw materials. If the content ratio of raw materials was unknown, the content of each component in the biaxially stretched films was measured by the following method.

Raw materials or biaxially stretched films were dissolved in 1,1,2,2-tetrachloroethane-$d_2$ to prepare samples for measurements, and $^1$H-NMR and $^{13}$C-NMR measurements were performed. The conditions of the $^1$H-NMR and $^{13}$C-NMR measurements are shown below.

In the $^{13}$C-NMR measurement, the contained components were identified from the measured signals. Then, the integral intensity ratio (molar ratio) per H atom of each contained component was determined from the signals measured by the $^1$H-NMR measurement, and converted into weight ratio by the formula weight of each component to determine the contents of the polyphenylene ether, styrene, and ethylene-butylene components.

The content of the polyphenylene ether resin in the biaxially stretched film is equal to the content of the polyphenylene ether component as determined above.

The content of the atactic polystyrene resin is determined by extracting the raw materials or biaxially stretched films with methyl ethyl ketone using a Soxhlet extractor at 50° C. for 4 hours to separate the insoluble and soluble fractions, drying and weighing each fraction, and determining the soluble fraction ratio. Since the soluble fraction contains the atactic polystyrene resin and the polyphenylene ether resin, $^1$H-NMR measurement of the soluble fraction is performed. The integral intensity ratio (molar ratio) per H atom of each contained component is determined from the measured signals, and converted into weight ratio by the formula weight of each component to determine the contents of the styrene component and the polyphenylene ether resin. The ratio of the styrene component in the raw materials or biaxially stretched films is determined from the soluble fraction ratio and the ratio of the styrene component in the soluble fraction, and is used as the content of the atactic polystyrene resin.

$^1$H-NMR Measurement
  Measurement device: AVANCE III-600 with Cryo Probe, produced by Bruker BioSpin
  Measurement frequency: 600 MHz
  Measurement solvent: 1,1,2,2-tetrachloroethane-$d_2$
  Measurement temperature: 300 K
  Chemical shift standard: 1,1,2,2-tetrachloroethane-$d_2$ ($^1$H; 6.00 ppm)

$^{13}$C-NMR Measurement
  Measurement device: AVANCE III-600 with Cryo Probe, produced by Bruker BioSpin
  Measurement frequency: 150 MHz
  Measurement solvent: 1,1,2,2-tetrachloroethane-$d_2$
  Measurement temperature: 300 K
  Chemical shift standard: 1,1,2,2-tetrachloroethane-$d_2$ ($^{13}$C; 73.78 ppm).

(1-6) Measurement of Temperature of Deflection Under Load of Modified Polyphenylene Ether Resin The measurement was carried out according ASTM D648. The thickness of the test piece was 6.4 mm, no annealing treatment was carried out, and the bending stress was set at 1.82 MPa.

(2) Production 1 of Resin Composition and Film (2-1) Resins Used
(A) Syndiotactic Polystyrene Resin (sPS)
  A1: XAREC (registered trademark) 90ZC, produced by Idemitsu Kosan Co., Ltd.
(B) Polyphenylene Ether Resin (PPE)
  B1: Iupiace (registered trademark) PX100L, produced by Mitsubishi Engineering-Plastics Corporation
(C) SEBS-Type Hydrogenated Styrene-Based Thermoplastic Elastomer
  C1: TUFTEC (registered trademark) H1517 (ethylene-butylene content=57%), produced by Asahi Kasei Corporation
  C2: KRATON (registered trademark) G1651 (ethylene-butylene content=69%), produced by Kraton Polymers Japan Ltd.
  C3: KRATON (registered trademark) G1650 (ethylene-butylene content=70%), produced by Kraton Polymers Japan Ltd.
(D) Atactic Polystyrene (aPS)
  D1: HF77, produced by PS Japan Corporation
(E) High-Impact Polystyrene (HIPS)
  E1: HT478 (HIPS is a graft copolymer obtained by graft-polymerizing a styrene monomer to a stem polymer of polybutadiene and a styrene-butadiene random copolymer; not containing ethylene-butylene components), produced by PS Japan Corporation (F) Spherical Silica
F1: SEAHOSTAR(registered trademark) KE P100, produced by Nippon Shokubai Co., Ltd.

(2-2) Blend Resins

Modified Polyphenylene Ether Resin 1 (m-PPE1)

B1 and D1 were mixed, and the mixture was supplied into a twin-screw melt kneader (2D30W2, produced by Toyo Seiki Seisaku-sho, Ltd.; L/D=30) together with nitrogen gas. The mixture was melt-kneaded at a cylinder temperature of 320° C. at a rotational speed of 100 rpm, and extruded through a strand die. The strand was cooled with water, and then cut into pellets, thereby obtaining m-PPE1. The temperature of deflection under load of m-PPE1 was 150° C.

Modified Polyphenylene Ether Resin 2 (m-PPE2)

B1 and C1 were mixed, and the mixture was supplied into a twin-screw melt kneader (2D30W2, produced by Toyo Seiki Seisaku-sho, Ltd.; L/D=30) together with nitrogen gas. The mixture was melt-kneaded at a cylinder temperature of 320° C. at a rotational speed of 100 rpm, and extruded through a strand die. The strand was cooled with water, and then cut into pellets, thereby obtaining m-PPE2. The temperature of deflection under load of m-PPE2 was 165° C.

SEBS-Containing Blend Resin (X)

A1, B1, and C1 were mixed, and the mixture was supplied into a twin-screw melt kneader (2D30W2, produced by Toyo Seiki Seisaku-sho, Ltd.; L/D=30) together with nitrogen gas. The mixture was melt-kneaded at a cylinder temperature of 300° C. at a rotational speed of 100 rpm, and extruded through a strand die. The strand was cooled with water, and then cut into pellets, thereby obtaining X.

(2-3) Method for Producing Resin Composition and Film

Example 1

Production of Unstretched Film

A resin composition obtained by mixing A1, m-PPE1, and X so that the content of each component was as shown in Table 1 was supplied into a pellet dryer and dried at 120° C. for 5 hours. The dried raw material was supplied into a single-screw film making machine (GM-50, produced by GM Engineering Co., Ltd.) together with nitrogen gas. The raw material was melted at a cylinder temperature of 330° C. and then filtered through a filter with a filtration accuracy of 5 μm, and the temperature was adjusted to 300° C., followed by extrusion through a T-die at 300° C. The molten resin was solidified by contact with a mirror surface metal roll (cooling roll) with a surface temperature of 60° C. by electrostatic adhesion, and molded into a film, thereby obtaining an unstretched film. The thickness of the unstretched film was about 30 μm; however, the extrusion amount and take-up speed were fine-tuned so that the thickness after stretching was the target value.

Production of Stretched Film

The unstretched film was introduced into a roll type longitudinal stretching machine, heated with a roll at 130° C., and stretched by a factor of 3.0 in the machine direction (MD). Then, the film was introduced into a tenter, and stretched by a factor of 3.5 in the traverse direction (TD) in an oven where the temperature of the stretching zone was 150° C. Then, the film was heat-fixed in the oven at 240° C., and 3% relaxed in the traverse direction in the oven at 130° C. The end of the film coming out of the tenter was slit and wound up, thereby obtaining a biaxially stretched film roll. The extrusion amount and take-up speed were fine-tuned so that the thickness of the film was 2.9 μm.

Example 2

An unstretched film and a biaxially stretched film with a thickness of 2.9 μm were obtained in the same manner as in Example 1, except for using a resin composition obtained by mixing A1, m-PPE1, and X so that the content of each component was as shown in Table 1.

Example 3

An unstretched film and a biaxially stretched film with a thickness of 2.9 μm were obtained in the same manner as in Example 1, except for using a resin composition obtained by mixing A1, m-PPE1, and X so that the content of each component was as shown in Table 1.

Example 4

An unstretched film and a biaxially stretched film with a thickness of 2.9 μm were obtained in the same manner as in Example 1, except for using a resin composition obtained by mixing A1, m-PPE1, and X so that the content of each component was as shown in Table 1.

Example 5

An unstretched film and a biaxially stretched film with a thickness of 2.9 μm were obtained in the same manner as in Example 1, except for using a resin composition obtained by mixing A1, m-PPE2, and X so that the content of each component was as shown in Table 1.

Example 6

An unstretched film and a biaxially stretched film with a thickness of 2.9 μm were obtained in the same manner as in Example 1, except for using a resin composition obtained by mixing A1, m-PPE1, and X so that the content of each component was as shown in Table 1.

Example 7

An unstretched film and a biaxially stretched film with a thickness of 2.9 μm were obtained in the same manner as in Example 1, except for using a resin composition obtained by mixing A1, m-PPE1, and X so that the content of each component was as shown in Table 1.

Example 8

An unstretched film and a biaxially stretched film with a thickness of 2.9 μm were obtained in the same manner as in Example 1, except for using a resin composition obtained by mixing A1, m-PPE1, and X so that the content of each component was as shown in Table 1.

Example 9

An unstretched film and a biaxially stretched film with a thickness of 2.9 μm were obtained in the same manner as in Example 1, except for using a resin composition obtained by mixing A1, m-PPE1, and X so that the content of each component was as shown in Table 1.

Example 10

An unstretched film and a biaxially stretched film with a thickness of 2.9 μm were obtained in the same manner as in Example 1, except for using a resin composition obtained by mixing A1, m-PPE1, and X so that the content of each component was as shown in Table 1.

Example 11

An unstretched film and a biaxially stretched film with a thickness of 2.9 μm were obtained in the same manner as in Example 1, except for using a resin composition obtained by mixing A1, m-PPE1, and X so that the content of each component was as shown in Table 1.

Example 12

An unstretched film and a biaxially stretched film with a thickness of 2.9 μm were obtained in the same manner as in Example 1, except for using a resin composition obtained by mixing A1, m-PPE1, and C1 so that the content of each component was as shown in Table 1.

Example 13

An unstretched film and a biaxially stretched film with a thickness of 2.9 μm were obtained in the same manner as in Example 1, except for using a resin composition obtained by mixing A1, m-PPE1, X, and F1 so that the content of each component was as shown in Table 1.

Example 14

An unstretched film and a biaxially stretched film with a thickness of 2.9 μm were obtained in the same manner as in Example 1, except for using a resin composition obtained by mixing A1, m-PPE2, and X so that the content of each component was as shown in Table 1.

Example 15

An unstretched film and a biaxially stretched film with a thickness of 2.9 μm were obtained in the same manner as in Example 1, except for using a resin composition obtained by mixing A1, m-PPE2, and X so that the content of each component was as shown in Table 1.

Comparative Example 1

An unstretched film and a biaxially stretched film with a thickness of 2.9 μm were obtained in the same manner as in Example 1, except for using a resin composition obtained by mixing A1 and C1 so that the content of each component was as shown in Table 1.

Comparative Example 2

An unstretched film and a biaxially stretched film with a thickness of 2.9 μm were obtained in the same manner as in Example 1, except for using a resin composition obtained by mixing A1, B1, and C2 so that the content of each component was as shown in Table 1.

Comparative Example 3

An unstretched film and a biaxially stretched film with a thickness of 2.9 μm were obtained in the same manner as in Example 1, except for using a resin composition obtained by mixing A1, B1, and C3 so that the content of each component was as shown in Table 1.

Comparative Example 4

An unstretched film and a biaxially stretched film with a thickness of 2.9 μm were obtained in the same manner as in Example 1, except for using a resin composition obtained by mixing A1 and B1 so that the content of each component was as shown in Table 1.

Comparative Example 5

An unstretched film and a biaxially stretched film with a thickness of 2.9 μm were obtained in the same manner as in Example 1, except for using a resin composition obtained by mixing A1 and B1 so that the content of each component was as shown in Table 1.

Comparative Example 6

An unstretched film and a biaxially stretched film with a thickness of 2.9 μm were obtained in the same manner as in Example 1, except for using a resin composition obtained by mixing A1 and B1 so that the content of each component was as shown in Table 1.

Comparative Example 7

An unstretched film and a biaxially stretched film with a thickness of 2.9 μm were obtained in the same manner as in Example 1, except for using a resin composition obtained by mixing A1 and B1 so that the content of each component was as shown in Table 1.

(3) Measurement and Evaluation Results 1

Table 1 shows the measurement results of the contents of components and ethylene-butylene (EB) (=contents in the resin composition) in the biaxially stretched films of the Examples and Comparative Examples in the "(2) Production 1 of Resin Composition and Film" section above, and the content of ethylene-butylene (EB) in SEBS used in the films. Table 1 also shows the evaluation results of the folding resistance of the unstretched films of the Examples and Comparative Examples in the "(2) Production 1 of Resin Composition and Film" section, and the dielectric breakdown strength of the biaxially stretched films of the Examples and Comparative Examples in the "(2) Production 1 of Resin Composition and Film" section.

TABLE 1

| | Content of each component in biaxially stretched film | | | | | | Styrene content | EB content |
|---|---|---|---|---|---|---|---|---|
| | (A) sPS mass % | (B) PPE mass % | (C) SEBS mass % | (D) aPS mass % | (E) HIPS mass % | (F) Silica mass % | In film mass % | In film mass % |
| Ex 1 | 67.80 | 21.63 | 1.87 | 8.70 | 0.00 | 0.00 | 77.30 | 1.07 |
| Ex 2 | 66.70 | 21.80 | 2.81 | 8.70 | 0.00 | 0.00 | 76.61 | 1.60 |
| Ex 3 | 65.60 | 21.96 | 3.74 | 8.70 | 0.00 | 0.00 | 75.91 | 2.13 |
| Ex 4 | 63.40 | 22.29 | 5.61 | 8.70 | 0.00 | 0.00 | 74.51 | 3.20 |
| Ex 5 | 68.40 | 24.74 | 6.86 | 0.00 | 0.00 | 0.00 | 71.35 | 3.91 |
| Ex 6 | 61.20 | 22.62 | 7.48 | 8.70 | 0.00 | 0.00 | 73.12 | 4.26 |
| Ex 7 | 59.00 | 22.95 | 9.35 | 8.70 | 0.00 | 0.00 | 71.72 | 5.33 |
| Ex 8 | 83.40 | 8.09 | 5.61 | 2.90 | 0.00 | 0.00 | 88.71 | 3.20 |
| Ex 9 | 73.40 | 15.19 | 5.61 | 5.80 | 0.00 | 0.00 | 81.61 | 3.20 |
| Ex 10 | 53.40 | 29.39 | 5.61 | 11.60 | 0.00 | 0.00 | 67.41 | 3.20 |
| Ex 11 | 48.40 | 32.94 | 5.61 | 13.05 | 0.00 | 0.00 | 63.86 | 3.20 |
| Ex 12 | 60.00 | 21.30 | 10.00 | 8.70 | 0.00 | 0.00 | 73.00 | 5.70 |
| Ex 13 | 63.30 | 22.29 | 5.61 | 8.70 | 0.00 | 0.10 | 74.41 | 3.20 |
| Ex 14 | 65.68 | 30.60 | 2.72 | 0.00 | 0.00 | 0.00 | 66.85 | 1.55 |
| Ex 15 | 64.04 | 30.99 | 4.97 | 0.00 | 0.00 | 0.00 | 66.18 | 2.83 |
| Comp Ex 1 | 90.00 | 0.00 | 10.00 | 0.00 | 0.00 | 0.00 | 94.30 | 5.70 |
| Comp Ex 2 | 76.00 | 4.00 | 20.00 | 0.00 | 0.00 | 0.00 | 82.20 | 13.80 |
| Comp Ex 3 | 90.00 | 5.00 | 5.00 | 0.00 | 0.00 | 0.00 | 91.50 | 3.50 |
| Comp Ex 4 | 90.00 | 10.00 | 0.00 | 0.00 | 0.00 | 0.00 | 90.00 | 0.00 |
| Comp Ex 5 | 75.00 | 25.00 | 0.00 | 0.00 | 0.00 | 0.00 | 75.00 | 0.00 |
| Comp Ex 6 | 70.00 | 30.00 | 0.00 | 0.00 | 0.00 | 0.00 | 70.00 | 0.00 |
| Comp Ex 7 | 65.00 | 35.00 | 0.00 | 0.00 | 0.00 | 0.00 | 65.00 | 0.00 |

| | EB content | Dielectric breakdown strength | | | Dielectric breakdown strength ratio | | |
|---|---|---|---|---|---|---|---|
| | | | | | 120° C. | 150° C. | |
| | In SEBS mass % | 23° C. $V_{DC}/\mu m$ | 120° C. | 150° C. | value/23° C. value | value/120° C. value | Folding resistance |
| Ex 1 | 57% | 500 | 495 | 487 | 0.990 | 0.984 | ○ |
| Ex 2 | 57% | 516 | 508 | 500 | 0.984 | 0.984 | ○ |
| Ex 3 | 57% | 530 | 522 | 515 | 0.985 | 0.987 | ○ |
| Ex 4 | 57% | 537 | 528 | 521 | 0.983 | 0.987 | ○ |
| Ex 5 | 57% | 535 | 529 | 525 | 0.989 | 0.992 | ○ |
| Ex 6 | 57% | 538 | 531 | 522 | 0.987 | 0.983 | ○ |
| Ex 7 | 57% | 542 | 515 | 498 | 0.950 | 0.967 | ○ |
| Ex 8 | 57% | 532 | 508 | 484 | 0.955 | 0.953 | ○ |
| Ex 9 | 57% | 534 | 517 | 501 | 0.968 | 0.969 | ○ |
| Ex 10 | 57% | 523 | 514 | 506 | 0.983 | 0.984 | ○ |
| Ex 11 | 57% | 511 | 502 | 493 | 0.982 | 0.982 | ○ |
| Ex 12 | 57% | 497 | 485 | 476 | 0.976 | 0.981 | Δ |
| Ex 13 | 57% | 487 | 484 | 479 | 0.994 | 0.990 | ○ |
| Ex 14 | 57% | 517 | 524 | 520 | 1.014 | 0.992 | ○ |
| Ex 15 | 57% | 527 | 533 | 530 | 1.011 | 0.994 | ○ |
| Comp Ex 1 | 57% | 404 | 365 | 328 | 0.903 | 0.899 | X |
| Comp Ex 2 | 69% | 516 | 461 | 406 | 0.893 | 0.881 | Δ |
| Comp Ex 3 | 70% | 495 | 436 | 371 | 0.881 | 0.851 | X |
| Comp Ex 4 | 0% | 500 | 438 | 362 | 0.876 | 0.826 | X |
| Comp Ex 5 | 0% | 502 | 447 | 375 | 0.890 | 0.839 | X |
| Comp Ex 6 | 0% | 498 | 442 | 399 | 0.888 | 0.903 | X |
| Comp Ex 7 | 0% | 465 | 440 | 421 | 0.946 | 0.957 | X |

The above results revealed that the use of the resin compositions of Examples 1 to 15, which are resin compositions comprising (1) a syndiotactic polystyrene resin, (2) a polyphenylene ether resin, and (3) a styrene-based thermoplastic elastomer, wherein the content of the polyphenylene ether resin in the resin composition is 6 mass % or more, resulted in films with excellent folding resistance and high dielectric breakdown strength (in particular, dielectric breakdown strength at high temperatures).

(4) Production 2 of Resin Composition and Film (4-1) Resins Used
(A) Syndiotactic Polystyrene Resin (sPS)
 A1: XAREC (registered trademark) 90ZC, produced by Idemitsu Kosan Co., Ltd.
(B) Polyphenylene Ether Resin (PPE)
 B1: Iupiace (registered trademark) PX100L, produced by Mitsubishi Engineering-Plastics Corporation (C) Atactic Polystyrene (aPS)
C1: HF77, produced by PS Japan Corporation
(D) SEBS-Type Hydrogenated Styrene-Based Thermoplastic Elastomer
D1: TUFTEC (registered trademark) H1517 (ethylene-butylene content=57%), produced by Asahi Kasei Corporation
D2: KRATON (registered trademark) G1650 (ethylene-butylene content=70%), produced by Kraton Polymers Japan Ltd.
(E) Spherical Silica
E1: SEAHOSTAR (registered trademark) KE P100, produced by Nippon Shokubai Co., Ltd.
(4-2) Blend Resins
Modified Polyphenylene Ether Resin 1 (m-PPE1)

B1 and C1 were mixed, and the mixture was supplied into a twin-screw melt kneader (2D30W2, produced by Toyo Seiki Seisaku-sho, Ltd.; L/D=30) together with nitrogen gas. The mixture was melt-kneaded at a cylinder temperature of 320° C. at a rotational speed of 100 rpm, and extruded through a strand die. The strand was cooled with water, and then cut into pellets, thereby obtaining m-PPE1. The temperature of deflection under load of m-PPE1 was 150° C.

SEBS-Containing Blend Resin (X)

A1, B1, and D1 were mixed, and the mixture was supplied into a twin-screw melt kneader (2D30W2, produced by Toyo Seiki Seisaku-sho, Ltd.; L/D=30) together with nitrogen gas. The mixture was melt-kneaded at a cylinder temperature of 300° C. at a rotational speed of 100 rpm, and extruded through a strand die. The strand was cooled with water, and then cut into pellets, thereby obtaining X.

(4-3) Method for Producing Resin Composition and Film

Example 16

Production of Unstretched Film

A resin composition obtained by mixing A1 and m-PPE1 so that the content of each component was as shown in Table 2 was supplied into in a pellet dryer and dried at 120° C. for 5 hours. The dried raw material was supplied into a single-screw film making machine (GM-50, produced by GM Engineering Co., Ltd.) together with nitrogen gas. The raw material was melted at a cylinder temperature of 330° C. and then filtered through a filter with a filtration accuracy of 5 μm, and the temperature was adjusted to 300° C., followed by extrusion through a T-die at 300° C. The molten resin was solidified by contact with a mirror surface metal roll (cooling roll) with a surface temperature of 60° C. by electrostatic adhesion, and molded into a film, thereby obtaining an unstretched film. The thickness of the unstretched film was about 30 μm; however, the extrusion amount and take-up speed were fine-tuned so that the thickness after stretching was the target value.

Production of Stretched Film

The unstretched film was introduced into a roll type longitudinal stretching machine, heated with a roll at 130° C., and stretched by a factor of 3.0 in the machine direction (MD). Then, the film was introduced into a tenter, and stretched by a factor of 3.5 in the traverse direction (TD) in an oven where the temperature of the stretching zone was 150° C. Then, the film was heat-fixed in the oven at 240° C., and 3% relaxed in the traverse direction in the oven at 130° C. The end of the film coming out of the tenter was slit and wound up, thereby obtaining a biaxially stretched film roll. The extrusion amount and take-up speed were fine-tuned so that the thickness of the film was 2.9 μm.

Example 17

An unstretched film and a biaxially stretched film with a thickness of 2.9 μm were obtained in the same manner as in Example 16, except for using a resin composition obtained by mixing A1, m-PPE1, and X so that the content of each component was as shown in Table 2.

Example 18

An unstretched film and a biaxially stretched film with a thickness of 2.9 μm were obtained in the same manner as in Example 16, except for using a resin composition obtained by mixing A1, m-PPE1, and X so that the content of each component was as shown in Table 2.

Example 19

An unstretched film and a biaxially stretched film with a thickness of 2.9 μm were obtained in the same manner as in Example 16, except for using a resin composition obtained by mixing A1, m-PPE1, and X so that the content of each component was as shown in Table 2.

Example 20

An unstretched film and a biaxially stretched film with a thickness of 2.9 μm were obtained in the same manner as in Example 16, except for using a resin composition obtained by mixing A1, m-PPE1, and X so that the content of each component was as shown in Table 2.

Example 21

An unstretched film and a biaxially stretched film with a thickness of 2.9 μm were obtained in the same manner as in Example 16, except for using a resin composition obtained by mixing A1, m-PPE1, and X so that the content of each component was as shown in Table 2.

Example 22

An unstretched film and a biaxially stretched film with a thickness of 2.9 μm were obtained in the same manner as in Example 16, except for using a resin composition obtained by mixing A1, m-PPE1, and X so that the content of each component was as shown in Table 2.

Example 23

An unstretched film and a biaxially stretched film with a thickness of 2.9 μm were obtained in the same manner as in Example 16, except for using a resin composition obtained by mixing A1, m-PPE1, X, and E1 so that the content of each component was as shown in Table 2.

Example 24

An unstretched film and a biaxially stretched film with a thickness of 2.9 μm were obtained in the same manner as in Example 16, except for using a resin composition obtained by mixing A1, m-PPE1, and X so that the content of each component was as shown in Table 2.

Comparative Example 8

An unstretched film and a biaxially stretched film with a thickness of 2.9 μm were obtained in the same manner as in Example 16, except for using a resin composition obtained by mixing A1 and B1 so that the content of each component was as shown in Table 2.

Comparative Example 9

An unstretched film and a biaxially stretched film with thickness of 2.9 μm were obtained in the same manner as in Example 16, except for using a resin composition obtained by mixing A1, B1, and C1 so that the content of each component was as shown in Table 2.

Comparative Example 10

An unstretched film and a biaxially stretched film with a thickness of 2.9 μm were obtained in the same manner as in Example 16, except for using a resin composition obtained by mixing A1, B1, C1 and D1 so that the content of each component was as shown in Table 2.

Comparative Example 11

An unstretched film and a biaxially stretched film with a thickness of 2.9 μm were obtained in the same manner as in Example 16, except for using a resin composition obtained by mixing A1 and B1 so that the content of each component was as shown in Table 2.

Comparative Example 12

An unstretched film and a biaxially stretched film with a thickness of 2.9 μm were obtained in the same manner as in Example 16, except for using a resin composition obtained by mixing A1 and B1 so that the content of each component was as shown in Table 2.

Comparative Example 13

An unstretched film and a biaxially stretched film with a thickness of 2.9 μm were obtained in the same manner as in Example 16, except for using a resin composition obtained by mixing A1 and B1 so that the content of each component was as shown in Table 2.

Comparative Example 14

An unstretched film and a biaxially stretched film with a thickness of 2.9 μm were obtained in the same manner as in Example 16, except for using a resin composition obtained by mixing A1 and B1 so that the content of each component was as shown in Table 2.

(5) Measurement and Evaluation Results 2

Table 2 shows the measurement results of the contents of components in the biaxially stretched films of the Examples and Comparative Examples in the "(4) Production 2 of Resin Composition and Film" section above. Table 2 also shows the evaluation results of the folding resistance of the unstretched films of the Examples and Comparative Examples in the "(4) Production 2 of Resin Composition and Film" section, and the dielectric breakdown strength of the biaxially stretched films of the Examples and Comparative Examples in the "(4) Production 2 of Resin Composition and Film" section.

TABLE 2

| | Content of each component in biaxially stretched film | | | | | Evaluation | | | | | |
|---|---|---|---|---|---|---|---|---|---|---|---|
| | | | | | | Dielectric breakdown strength | | | Dielectric breakdown strength ratio | | |
| | (A) sPS mass % | (B) PPE mass % | (C) aPS mass % | (D) SEBS mass % | (E) Silica mass % | 23° C. $V_{DC}$/μm | 120° C. | 150° C. | 120° C. value/ 23° C. value | 150° C. value/ 120° C. value | Folding resistance |
| Ex 16 | 70.00 | 21.30 | 8.70 | 0.00 | 0.00 | 501 | 496 | 490 | 0.990 | 0.988 | Δ |
| Ex 17 | 56.70 | 28.90 | 11.60 | 2.81 | 0.00 | 513 | 512 | 508 | 0.998 | 0.992 | ○ |
| Ex 18 | 61.70 | 25.35 | 10.15 | 2.81 | 0.00 | 515 | 511 | 504 | 0.992 | 0.986 | ○ |
| Ex 19 | 66.70 | 21.80 | 8.70 | 2.81 | 0.00 | 516 | 508 | 500 | 0.984 | 0.984 | ○ |
| Ex 20 | 71.70 | 18.25 | 7.25 | 2.81 | 0.00 | 518 | 506 | 495 | 0.977 | 0.978 | Δ |
| Ex 21 | 71.20 | 15.52 | 5.80 | 7.48 | 0.00 | 523 | 512 | 498 | 0.979 | 0.973 | Δ |
| Ex 22 | 86.70 | 7.60 | 2.90 | 2.81 | 0.00 | 506 | 487 | 452 | 0.962 | 0.928 | Δ |
| Ex 23 | 61.60 | 25.35 | 10.15 | 2.81 | 0.10 | 482 | 477 | 472 | 0.990 | 0.990 | ○ |
| Ex 24 | 65.40 | 20.87 | 8.12 | 5.61 | 0.00 | 528 | 528 | 523 | 1.000 | 0.991 | ○ |
| Comp Ex 8 | 95.00 | 5.00 | 0.00 | 0.00 | 0.00 | 493 | 434 | 360 | 0.880 | 0.829 | X |
| Comp Ex 9 | 90.00 | 5.00 | 5.00 | 0.00 | 0.00 | 495 | 436 | 371 | 0.881 | 0.851 | X |
| Comp Ex 10 | 85.00 | 5.00 | 5.00 | 5.00 | 0.00 | 503 | 439 | 357 | 0.873 | 0.813 | X |
| Comp Ex 11 | 90.00 | 10.00 | 0.00 | 0.00 | 0.00 | 500 | 438 | 362 | 0.876 | 0.826 | X |
| Comp Ex 12 | 75.00 | 25.00 | 0.00 | 0.00 | 0.00 | 502 | 447 | 375 | 0.890 | 0.839 | X |
| Comp Ex 13 | 70.00 | 30.00 | 0.00 | 0.00 | 0.00 | 498 | 442 | 399 | 0.888 | 0.903 | X |
| Comp Ex 14 | 65.00 | 35.00 | 0.00 | 0.00 | 0.00 | 465 | 440 | 421 | 0.946 | 0.957 | X |

The above results revealed that the use of the resin compositions of Examples 16 to 24, which are resin compositions comprising (1) a syndiotactic polystyrene resin, (2) a polyphenylene ether resin, and (3) an atactic polystyrene resin, wherein the content of the polyphenylene ether resin in the resin composition is 6 mass % or more, resulted in films with excellent folding resistance and high dielectric breakdown strength (in particular, dielectric breakdown strength at high temperatures).

The invention claimed is:
1. A resin composition comprising:
   (1) a syndiotactic polystyrene resin,
   (2) a polyphenylene ether resin, and
   (3) at least one member selected from the group consisting of styrene-based thermoplastic elastomers and atactic polystyrene resins;

wherein the content of the polyphenylene ether resin in the resin composition is 6 mass % or more; and when the resin composition comprises the styrene-based thermoplastic elastomers, the content of the styrene-based thermoplastic elastomers in the resin composition is 18 mass % or less.

2. The resin composition according to claim 1, wherein the content of the syndiotactic polystyrene resin in the resin composition is 40 mass % or more and less than 94 mass %.

3. The resin composition according to claim 1, wherein the content of the polyphenylene ether resin in the resin composition is 6 mass % or more and 40 mass % or less.

4. The resin composition according to claim 1, comprising a styrene-based thermoplastic elastomer.

5. The resin composition according to claim 1, wherein the content of the styrene-based thermoplastic elastomer in the resin composition is 1 mass % or more and 20 mass % or less.

6. The resin composition according to claim 1, wherein the content of a conjugated diene compound polymer block and/or a hydrogenated block thereof (Sb) in the styrene-based thermoplastic elastomer is 20 to 75 mass %.

7. The resin composition according to claim 1, wherein the content of the conjugated diene compound polymer block and/or the hydrogenated block thereof (Sb) in the resin composition is 1 to 10 mass %.

8. The resin composition according to claim 1, wherein the styrene-based thermoplastic elastomer is a styrene-ethylene-butylene-styrene block copolymer (SEBS).

9. The resin composition according to claim 1, comprising an atactic polystyrene resin.

10. The resin composition according to claim 1, wherein the content of the atactic polystyrene resin in the resin composition is 2 mass % or more and 20 mass % or less.

11. A film comprising a film-like layer of the resin composition according to claim 1.

12. The film according to claim 11, which is a biaxially stretched film.

13. The film according to claim 11, which is a single-layer film.

14. The film according to claim 11, which has a thickness of 1 μm or more and 10 μm or less.

15. The film according to claim 11, for use in a capacitor.

16. A capacitor metallized film having a metal film on one side or both sides of the film according to claim 11.

17. A capacitor comprising the film according to claim 11.

18. The resin composition according to claim 1,
wherein the content of the syndiotactic polystyrene resin in the resin composition is 40 mass % or more and less than 94 mass %;
the content of the polyphenylene ether resin in the resin composition is 6 mass % or more and 40 mass % or less; and
when the resin composition comprises the atactic polystyrene resin, the content of the atactic polystyrene resin in the resin composition is 20 mass % or less.

* * * * *